United States Patent [19]

Zarouri et al.

[11] Patent Number: 5,027,240

[45] Date of Patent: Jun. 25, 1991

[54] DISK HEAD ASSEMBLY LOAD BEAM

[75] Inventors: Mourad Zarouri, San Diego; Carl J. Carlson, Poway, both of Calif.

[73] Assignee: Computer & Communications Technology Corp., San Diego, Calif.

[21] Appl. No.: 328,874

[22] Filed: Mar. 27, 1989

[51] Int. Cl.$^5$ .............................................. G11B 5/48
[52] U.S. Cl. ...................................... 360/104; 360/103
[58] Field of Search ................................ 360/103, 104

[56] References Cited

U.S. PATENT DOCUMENTS

| | | | |
|---|---|---|---|
| 3,931,641 | 1/1976 | Watrous | 360/104 |
| 4,422,115 | 12/1983 | Spash | 360/104 |
| 4,853,811 | 8/1989 | Brooks, Jr. et al. | 360/103 |

FOREIGN PATENT DOCUMENTS

| | | | |
|---|---|---|---|
| 0324966 | 7/1989 | European Pat. Off. | 360/104 |
| 60-127578 | 7/1985 | Japan | 360/104 |
| 2086124 | 5/1982 | United Kingdom | 360/104 |

OTHER PUBLICATIONS

IBM/TDB, vol. 31, No. 3, Aug. 1988, pp. 154–155, "Method of Fluxless Termination for Thin Film".

IBM/TDB, vol. 18, No. 11, Apr. 1976, pp. 3813–3814, "Low-Load Beam Suspension", by Watrous.

Primary Examiner—John H. Wolff
Attorney, Agent, or Firm—Spensley Horn Jubas & Lubitz

[57] ABSTRACT

A computer disk head assembly load beam having improved vibrational characteristics. The inventive load beam has reduced mass and increased resonant frequencies for at least the first and second resonant modes in comparison to the prior art, while maintaining a spring rate approximately equivalent to the spring rate of prior art load beams. In addition, the invention exhibits a high degree of torsional stiffness. These characteristics are accomplished by providing a load beam having a delta-shaped forebody, an elongated arm portion, and short, relatively thick spring attachment beams connecting the base of the load beam to the insert-attachment portion of the load beam. The spring attachment beams of the load beam structure provide a spring rate approximately equivalent to the spring rate of prior art load beams. The invention also permits a reduction in the height of the load beam strengthening flanges, permitting decreased disk spacing.

8 Claims, 2 Drawing Sheets

DISK HEAD ASSEMBLY LOAD BEAM

BACKGROUND OF THE INVENTION

1. Field of the Invention

This invention relates to computer disk head assemblies, and more particularly to a computer disk head assembly load beam having improved vibrational and torsional stiffness characteristics.

2. Related Art

Magnetic disk drives have become an important part of the computer industry. Typical modern magnetic disk drives have a plurality of flat, circular, spaced apart disks rotating about a common spindle. Data is stored on a magnetic media formed on the surface of the disks. Data is divided into groupings called "tracks" that form concentric rings on the surface of the disks. A read/write head is positioned above each side of a disk. As the disk spins beneath a head, the head can magnetize the magnetic media in a track, thereby writing onto the track. After data is stored on a track, the read/write head can be positioned above a track, and as the disk spins, the head can read back the magnetic pattern stored on the disk track. To write on or to read from different tracks, the read/write heads merely need to be moved towards or away from the spindle.

The read/write heads typically comprise an electromagnetic core and coil mounted on a "slider" which has an air-bearing surface positioned immediately adjacent the flat surface of a disk. As the disk spins, the air following the disk applies pressure to the slider's air-bearing surface, and lifts the slider and read/write core and coil off of the surface of the disk.

The slider body is attached to a component called a flexure. A flexure allows the slider body to gimbal to follow fluctuations in the surface of a disk while restricting the slider's motion in undesired directions with respect to the disk. To support a flexure in the proper position, the flexure is attached to an elongated load beam which in turn is attached to an arm coupled to a carriage in the disk drive. The load beam is generally made of steel and acts as a leaf spring to bias the slider towards a disk.

FIG. 2 shows a typical prior art load beam. Typically, each such load beam 20 comprises an essentially square attachment area 22, with a tapered arm portion 24 which normally is adapted for attaching the further end of the load beam 20 to a flexure (not shown).

Usually, the square attachment area 22 of the load beam 20 is welded to a flat "insert" 26. The insert 26 gives sufficient rigidity and strength to permit conveniently attaching the load beam 20 to an arm of, for example, an "E-block" carriage (not shown), as is known in the art.

It is important that the air-bearing surface of the slider attached to the flexure be substantially parallel to the disk surface. In typical prior art structures, the arm of the carriage is offset from the surface of a disk. Therefore, when the load beam/flexure assembly is mounted in a disk drive, the elongated arm 24 of the load beam is bent at a small angle in order to extend from the carriage arm to near the disk. To compensate for this small angle, the flexure is bent at a small angle to the base of the load beam 20. Thus, the slider's air-bearing is maintained substantially parallel to the surface of a disk.

Over the past several years, the size of disk drives has shrunken considerably, from a 14-inch form factor down to as little as a 2½-inch form factor at present. While the physical size of disk drives has been shrinking, the density of information storage on the disks of such disk drives has been increasing. Both the number of bits per inch (bpi) and tracks per inch (tpi) have increased significantly over the past several years. Furthermore, the speed of access of the head assembly from track to track in such disk drives has also been increasing, resulting in higher performance disk drives.

As a result of decreasing disk size, increasing data density (in particular, increasing tracks per inch), and decreasing head movement times, the problem of maintaining accurate head position over a selected data track has becoming increasing difficult. This problem is aggravated by the fact that the platter surfaces of disk drives are not perfectly flat. Thus, the spring bias provided by a load beam is important in maintaining a bias on the slider such that the slider maintains an approximately constant distance from its disk as the surface of the disk varies. Maintaining such a constant distance and an accurate head position is extremely difficult if the structure on which each magnetic read/write head is mounted vibrates to such a degree that data reading or writing ability is impaired.

Since all head assembly structures have resonant vibrational modes, one means of reducing undesirable vibration is to increase the resonant frequency for the most fundamental resonant modes to a level higher than is likely to be encountered in a disk drive system. Thus, vibration caused by imbalances in the rotating disk platters, movement of the head assembly across the disk, and other sources can be significantly reduced if the resonant frequencies of the appropriate portions of the head assembly structure can be increased.

For example, it is known that the first resonant mode of load beams such as those of the prior art is an "up and down" motion pivoting around the "spring axis" of the load beam. The second resonant mode is known to be a twisting of the load beam around its longitudinal axis. High-amplitude movements from the first resonant mode are undesirable because they cause fluctuations in the distance of the magnetic read/write head from the magnetic disk surface. The second resonant mode is undesirable because the twisting of the load beam arm causes changes in the length of the arm, which in turn causes the read/write head to move off track. In addition, such twisting may cause a slider to tilt with respect to a disk surface rather than remaining parallel to such a surface. It is therefore desirable to raise the resonant frequency of both the first and second resonant modes of a load beam to a level that is less likely to be encountered in a disk drive environment.

The prior art in the past has used damping material on the flexure portion of a load beam structure to reduce vibration. However, such damping material increases the mass of a load beam, thereby impairing the ability to rapidly move the load beam from one point to another. Adding such damping material also increases the cost of manufacture of the load beam structure.

It is desirable to increase the resonant frequency of such load beams in order to better maintain the position of an attached read/write head over the desired portion of a disk. It is also desirable to maintain spring characteristics in the load beam that are comparable to those known and relied upon by engineers in the art. In designing a load beam, it is also important to maintain both structural rigidity with respect to all degrees of freedom except the necessary up and down motion around the "spring axis" to accommodate variations in the disk surface. It is also desirable to provide a load beam with resonant frequency characteristics such that damping material can be minimized or eliminated.

It is therefore an object of this invention to provide a load beam structure that has a spring rate equivalent to the spring rate of prior art load beams, while having resonant frequencies for at least the first and second resonant modes that are substantially higher than the corresponding resonant frequencies of prior art load beams.

SUMMARY OF THE INVENTION

The present invention comprises a disk drive head assembly load beam having reduced mass and increased resonant frequencies for at least the first and second resonant modes in comparison to the prior art, while maintaining a spring rate approximately equivalent to the spring rate of prior art load beams. In addition, the present invention exhibits a high degree of torsional stiffness. These characteristics are accomplished by providing a load beam having a delta-shaped forebody, an elongated arm portion, and short, relatively thick spring attachment beams connecting the base of the load beam forebody to the insert-attachment portion of the load beam. The spring attachment beams of the novel load beam structure provide a spring rate approximately equivalent to the spring rate of prior art load beams. Torsional stiffness results from widely spacing the spring attachment beams.

Further aspects of the present invention will become apparent from the following detailed description when considered in conjunction with the accompanying drawings. It should be understood, however, that the detailed description and the specific example, while representing a preferred embodiment of the invention, are given by way of illustration only.

BRIEF DESCRIPTION OF THE DRAWINGS

Like reference characters in the various drawings refer to like elements.

DETAILED DESCRIPTION OF THE INVENTION

Figure 1A:
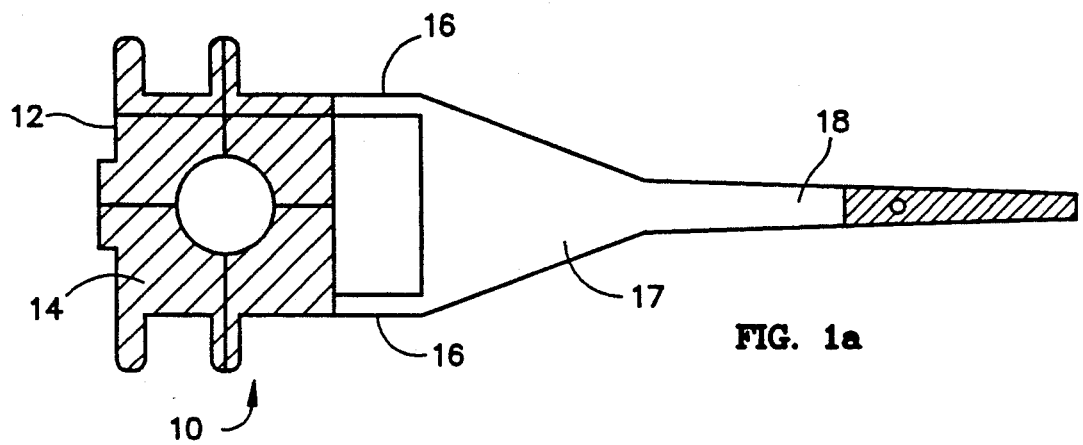
FIG. 1a is a side view of the load beam shown in FIG. 1.
Figure 1B:
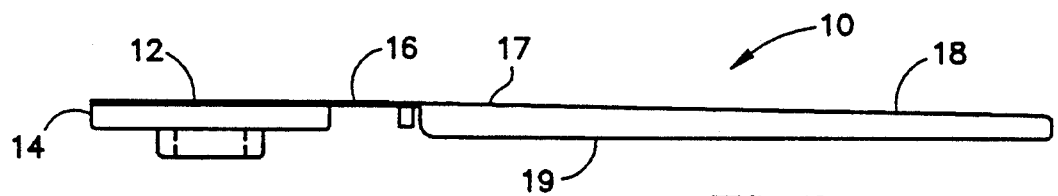
FIG. 1 is a top plan view of a load beam in accordance with the present invention.
Figure 3:
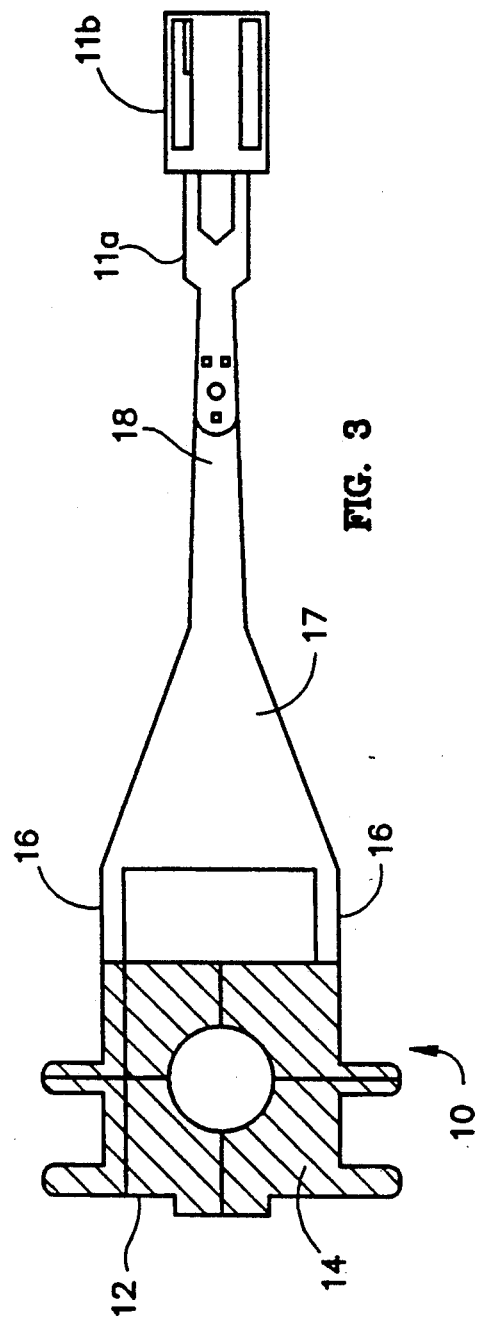
FIG. 3 is a bottom plan view of the present invention shown with an attached flexure and slider.

FIG. 1 shows a top plan view of a load beam 10 made in accordance with the present invention. The load beam comprises an essentially square attachment area 12 to which is attached a flat insert 14 (see also FIG. 1a). The attachment area 12 is coupled by means of two spring attachment beams 16 to a delta-shaped forebody 17 having a broad base, which preferably "blends" into an elongated arm 18 having a narrow end 19. Multiple spring attachment beams 16 can be used in general. The elongated arm 18 may have a means at its further end adapted for attaching the load beam 10 to a flexure 11a and attached slider 11b (shown in FIG. 3).

The load beam 10 is typically stamped as a single piece from stainless steel sheet stock. The insert 14 is normally attached to the attachment area 12 of the load beam 10 by welding.

In order to provide a spring rate for the load beam 10 comparable to the spring rate of prior art load beam designs, the load beam 10 is typically stamped from a somewhat thicker metal sheet than prior art load beams. This means that the spring attachment beams 16 are thicker than the equivalent region of prior art load beams that joins the elongated arm of such prior art load beams to the insert attachment area (in FIG. 2, the entire width of the connecting area 28 helps determine the spring rate of the load beam 24). In the present design, the relatively thick spring connecting beams 16 provide an equivalent spring rate, since spring rate is proportional to WIDTH×THICKNESS$^3$/LENGTH$^3$.

It is possible to shorten the attachment spring beams 16 to provide a spring rate equivalent to the prior art rather than to fabricate the load beam 10 out of thicker sheet stock. By shortening the attachment spring beams 16 and using thinner sheet stock, the mass of the load beam 10 overall would be reduced, thereby reducing its inertia. This would increase the resonant frequency of the first resonant mode, but would require a compensating change in the length of the forebody 17 and/or elongated arm 18 so that the length of the load beam 10 as a whole remained the same.

Placing the spring attachment beams 16 at the outer sides of the load beam provides greater resistance to torque on the load beam induced by vibration and translational movement. Increased torsional stiffness helps maintain the proper attitude of the attached slider with respect to the disk during installation and use. However, the spring attachment beams 16 may be moved inwardly if desired.

FIG. 1A shows a side view of the inventive load beam design, indicating stiffening flanges 19 that run substantially the length of the forebody 17 and elongated arm 18. These flanges serve to stiffen the load beam so that all bending is essentially at the spring attachment beams 16. It has been found that by using the design shown in FIG. 1, the height of the flanges can be decreased, and still achieve equal or higher resonant frequencies than the prior art. For example, in prior art load beams the height of such flanges might be 0.03 inches at the attachment area end, tapering to 0.02 inches at the flexure-attachment end.

With the present design, for load beams to be used in a comparable environment, the comparable flange heights can be 0.027 inches (a 10% decrease in height) tapering to 0.015 inches (a 25% decrease in height). This is advantageous since it permits closer spacing between disk platters in a disk drive, resulting in a more compact drive or a drive having a greater number of disk platters. When used in combination with a flexure and notched slider assembly of the type disclosed in U.S. application Ser. No. 07/328,869, entitled "DISK HEAD ASSEMBLY FLEXURE" (filed concurrently herewith, assigned to the assignee of the present invention, and incorporated herein by reference), a substantial reduction in disk head assembly height can be achieved, resulting in even more compact drives or drives having a greater number of disk platters.

In manufacturing a load beam in accordance with the present invention, it normally is desirable to round or "blend" the intersection point of the delta-shaped forebody 17 with the elongated arm 18 to reduce stress. A typical radius value would be 0.500 inches.

Alternatively, rather than manufacture the inventive load beam 10 with a distinct delta-shaped forebody 17 and elongated arm 18, the sides of the load beam 10 can be made as continuous concave curves that start at approximately the outer edges of the spring beams 16 and converge to a narrow end.

The multiple spring beams 16 of the present invention not only maintain the spring rate of the load beam at a value approximately equivalent to the prior art, but the spring beams 16 help increase the resonant frequency of the first resonant mode and significantly increase the resonant frequency of the second resonant mode. The increase in the resonant frequency of the first resonant mode is thought to occur due to the decrease in mass of the load beam 10, caused in great part by the lack of a continuous width of connecting metal joining the attachment area 12 to the remainder of the load beam.

The delta-shaped forebody 17 shown in FIG. 1 is important to increasing the resonant frequency of the second resonant mode. The shape of the forebody 17 and the narrow body of the elongated arm 18 also contribute to a reduction in the overall mass of the load beam 10, thus increasing the resonant frequency of the first resonant mode.

The length of the forebody 17 will vary with respect to the total length of the forebody 17 plus the elongated arm 18. Thus, a shorter forebody "delta" can be employed, thereby further reducing the mass of the load beam 10. However, if the length of the forebody 17 is shortened too much, the resonant frequency of the third resonant mode (a combination of bending and twisting motions) will decrease. It is desirable to keep the resonant frequency of the third resonant mode higher than the resonant frequency of the second resonant mode. It has been found from finite-element analysis of the resonant frequencies of modeled load beams that for a Model 3370-type disk drive load beam (an industry standard), the ratio of the length of the forebody 17 to the combined length of the forebody 17 and elongated arm 18 is preferably approximately 24%. For more modern style 2½-3½ inch disk drive load beams, it has been found that the comparable ratio is preferably about 40%.

It is believed that some advantage in increased resonant frequencies in comparison to the prior art will be observed in load beams made in accordance with the present invention in virtually every case where the length of the delta-shaped forebody 17 is less than the combined length of the forebody 17 and elongated arm 18.

Although the elongated arm 18 shown in FIG. 1 has tapered sides, the elongated arm 18 alternatively can have parallel sides if desired. If the sides are tapered, the degree of tapering should not decrease the structural rigidity of the load beam as a whole to an unacceptable point if the end of the elongated arm 18 is narrowed. If instead the elongated arm 18 is widened at its intersection with the forebody 17, significant additional mass should not be added to the point where the resonant frequencies of the first or second resonant modes substantially decrease.

Figure 2:
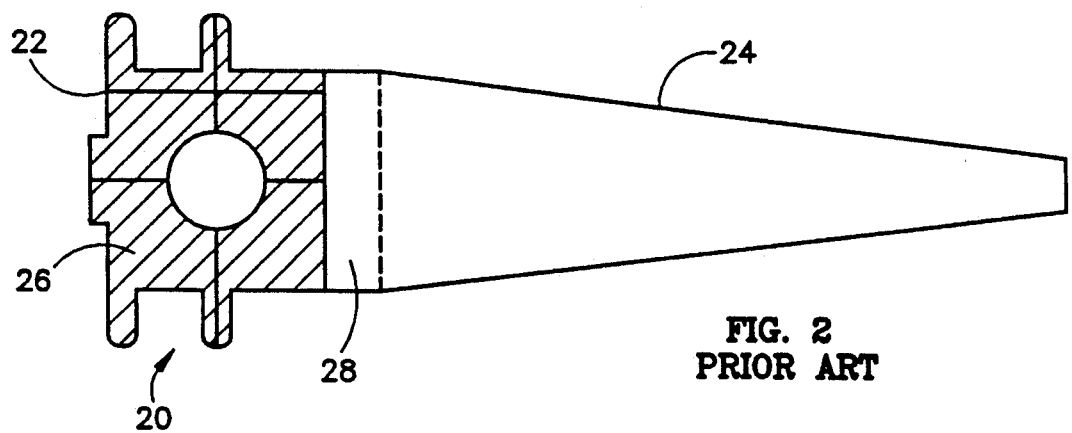
FIG. 2 is a top plan view of a prior art load beam.

It has been found by computer simulation of a prior art load beam configured substantially as shown in FIG. 2 that the resonant frequency of the first mode is about 2100 Hz, while the resonant frequency of the second resonant mode is about 2500 Hz. Testing of a similarly sized load beam 10 made in accordance with the invention, and substantially in the shape shown in FIG. 1, shows a first resonant frequency of about 2800 Hz, and a second resonant frequency of about 5000 Hz, The present invention thus provides significant advantages over the prior art.

Although the present invention has been described in connection with a particular embodiment thereof, additional embodiments, applications and modifications, which will be obvious to those skilled in the art, are included within the spirit and scope of the invention. For example, the double spring attachment beams 16 can be used in a load beam that is otherwise shaped like prior art load beams. This would reduce the mass of the load beam as a whole, and therefore increased the resonant frequency of at least the first resonant mode. Further, the forebody and elongated arm described above could be used without multiple spring attachment beams. Therefore, this invention is not to be limited to the specific embodiment discussed and illustrated herein, but rather by the following claims.

We claim:

1. A load beam for a disk head assembly, including:
   (a) an elongated arm for supporting an air-bearing read/write head assembly;
   (b) a delta-shaped forebody connected to the elongated arm, the ratio of the length of the delta-shaped forebody to the combined length of the delta-shaped forebody and the elongated arm being in the range of about 24% to about 40%;
   (c) an attachment area connected to the delta-shaped forebody.

2. The load beam of claim 1 further including strengthening flanges along the edges of the elongated arm and the forebody.

3. A load beam for a disk head assembly, including:
   (a) a delta-shaped first planar member having edges converging from a base end to a narrow end, the base end being wider than the narrow end;
   (b) an elongated second planar member, at one end being as wide as and attached to the narrow end of the first planar member, for supporting an air-bearing read/write head assembly at the opposite end of the second planar member, the ratio of the length of the first planar member to the combined length of the first planar member and the second planar member being in the range of about 24% to about 40%;
   (c) a third planar member connected to the base end of the first planar member, for attaching the load beam to other structures.

4. The load beam of claim 3 further including flanges along the edges of the first planar member, for strengthening the first planar member.

5. A load beam for a disk head assembly, including:
   (a) an elongated arm for supporting an air-bearing read/write head assembly;
   (b) a delta-shaped forebody connected to the elongated arm, the ratio of the length of the delta-shaped forebody to the combined length of the delta-shaped forebody and the elongated arm being in the range of about 24% to about 40%;
   (c) a pair of spring beams connected at one end to the delta-shaped forebody;
   (d) an attachment area connected to the other ends of the pair of spring beams.

6. The load beam of claim 5 further including strengthening flanges along the edges of the elongated arm and the forebody.

7. A load beam for a disk head assembly, including:

(a) a delta-shaped first planar member having edges converging from a base end to a narrow end, the base end being wider than the narrow end;

(b) an elongated second planar member, at one end being as wide as and attached to the narrow end of the first planar member, for supporting an air-bearing read/write head assembly at the opposite end of the second planar member, the ratio of the length of the first planar member to the combined length of the first planar member and the second planar member being in the range of about 24% to about 40%;

(c) at least two spring beam members connected at one end to the base end of the first planar member;

(d) a third planar member connected to the other ends of the spring beam members, for attaching the load beam to other structures.

8. The load beam of claim 7 further including flanges along the edges of the first planar member, for strengthening the first planar member.

* * * * *